Feb. 11, 1958   W. V. VAN WYHE   2,822,947
COMBINATION MANURE SPREADER, FEED MIXER AND ELEVATOR
Filed Aug. 30, 1956   2 Sheets-Sheet 1

INVENTOR.
Wayne V. Van Wyhe
BY
Sam J. Slotoky
ATTORNEY

Feb. 11, 1958   W. V. VAN WYHE   2,822,947
COMBINATION MANURE SPREADER, FEED MIXER AND ELEVATOR
Filed Aug. 30, 1956   2 Sheets-Sheet 2

INVENTOR.
Wayne V. Van Wyhe
BY
ATTORNEY

2,822,947

COMBINATION MANURE SPREADER, FEED MIXER AND ELEVATOR

Wayne V. Van Wyhe, Lester, Iowa

Application August 30, 1956, Serial No. 607,135

1 Claim. (Cl. 214—522)

My invention relates to a combination farm device.

An object of my invention is to provide a combination manure spreader, feed mixer and elevator wherein the device can be interchangeably used for either purpose.

A further object of my invention is to provide a feed mixer which is mounted on a suitable vehicle receptacle and which will automatically break up the feed, such as silage and the like, and discharge the same into an elevating device which will convey the feed upwardly through a discharge elevator, and so that the thoroughly broken up and mixed feed can be conveniently discharged into a lengthened trough or other arrangement, all of the above being accomplished by the drawing tractor which powers the arrangement.

A further object of my invention is to provide a unit which can be changed over to a manure spreader if desired.

A further object of my invention is to provide an arrangement which discharges forwardly of the unit, and is therefore immediately behind the driver of the tractor, so that the operation of the device can always be observed by the operator.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
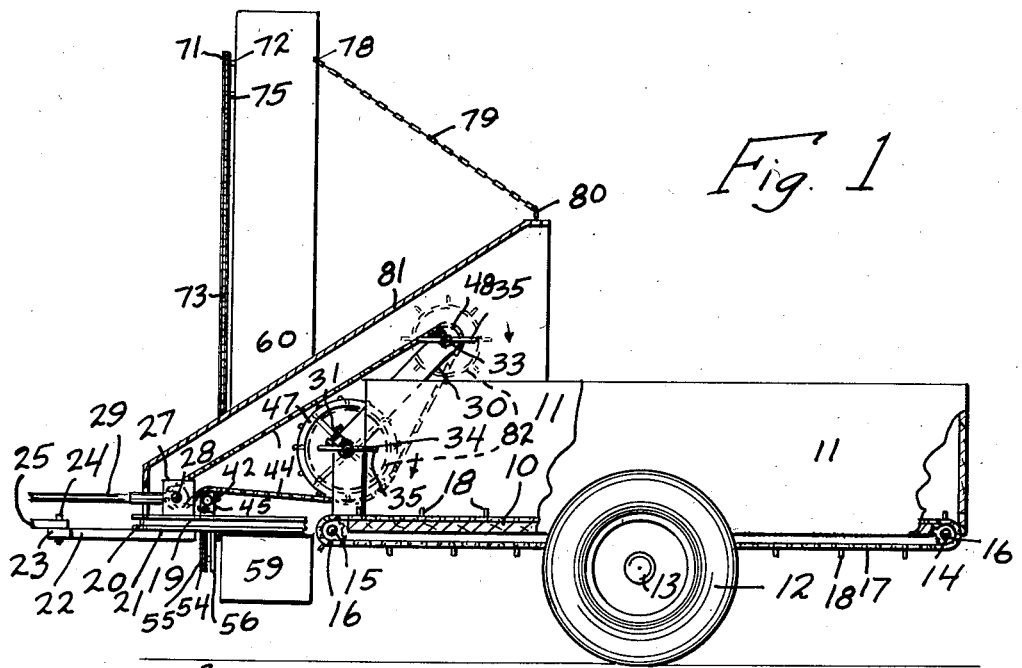
Figure 1 is a side sectional view and elevation of my device.

My invention contemplates the provision of a combination device which includes several features such as feed mixing elements, side delivery conveying elements, and which device can be adapted to be used for a manure spreader as well.

I have used the character 10 to indicate the bottom wall of a vehicle box having the side walls 11, the vehicle including the pair of side wheels 12 suitably mounted on the axle 13, and I have used the character 14 to indicate a rear shaft and the character 15 a forward shaft, and attached to the shafts 14 and 15 are the sprockets 16 over which pass the sprocket chains 17 between which chains are attached the paddles or conveying bars 18 to convey material along the bottom wall 10.

Attached to the side walls 11 are the substantially U-shaped channel members 19 which pass forwardly and continue into the integral forward portion 20 to which is attached at 21 the hitch braces 22 which are secured to the hitching portion 23 which portion 23 is adapted to be attached at 24 to the draw-bar 25 of the tractor which is adapted to draw the entire arrangement.

Secured across the members 19 is a platform or strap 26 on which is mounted the casing 27 including suitable gearing therein adapted to drive the shaft 28, which shaft 28 is driven by means of the connecting shaft 29 which is suitably connected to the rear power take-off shaft of the tractor.

Attached to the side members 19 are the brackets 30, the brackets 30 including the cavities 31 for the reception of suitable bearings 32 in which bearings are secured the rotatable shafts 33 and 34, and attached to the shafts 33 and 34 are the laterally spaced paddle members 35. The bearings 32 can be secured by means of the ears 36 and bolts 37, this construction providing means whereby the shafts 33 and 34 can be removed for the manure spreading units as will be explained.

Attached to the shaft 34 is a cam member 38 adapted to bear against a roller 39 which roller operates a pawl 40 which pawl 40 engages a toothed wheel 41, this arrangement providing means for operating the chain 17, the toothed wheel 41 being secured to the forward shaft 15.

The shaft 28 is journalled in a suitable bearing 42 and is attached to a sprocket 43 over which sprocket passes a chain 44, the chain 44 passing over an idler sprocket 45 attached to the bearing 46, the chain 44 thence passing under the further large sprocket wheel 47, and thence passing over the further smaller sprocket wheel 48 which is attached to the upper shaft 33, the chain thence passing back to the sprocket 43 (see Figure 1).

Figure 2:
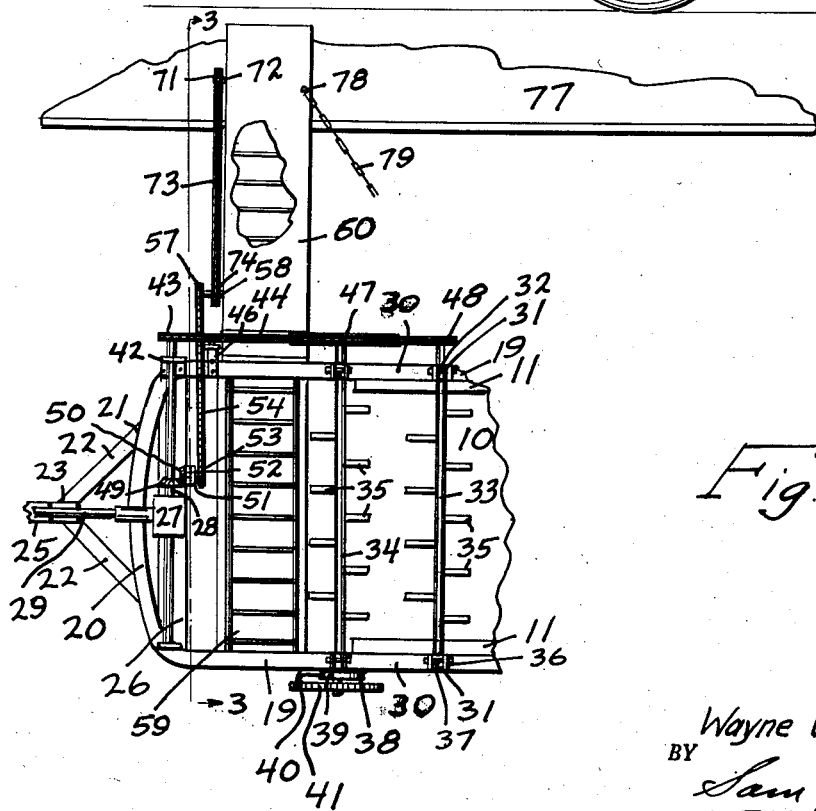
Figure 2 is a plan view of the rear portion of the device.

Also attached to the shaft 28 is a bevel gear 49 which meshes with a further bevel gear 50 (see Figure 2), which bevel gear 50 is secured to a shaft 51 suitably journalled in bracket 52, and attached to the shaft 51 is a sprocket 53 over which passes a sprocket chain 54 which passes beneath an idler sprocket 55 secured to the support 56. The chain 54 thence passes over a further sprocket 57 which is secured to a transverse shaft 58 which is adapted to drive the end sprockets of the horzontal chute 59 and the inclined chute 60, it being understood that these sprockets will also drive the conveyor chains 61 and 62 in these conveyor units. The horizontal chute 59 is suitably secured as at 63 or in any other desired manner to the members 19, and the member 59 includes the angularly positioned side plate portions 64. The member 59 also includes the medially positioned wall 65 and includes the curved angle members 66 to guide the chains 62 of the conveyor system, which are curved in the same manner as the curved portions 68 of the chute.

The further angular chute 60 includes the partition wall 69 over which passes the chain 61 having the suitable conveyor slats as shown, the chain 61 being driven by an upper sprocket 71 and shaft 72 over which passes a further sprocket chain 73 which in turn passes over a lower sprocket 74 which is driven by the shaft 58, the chain 73 passing over the idler sprocket 75.

Figure 4:
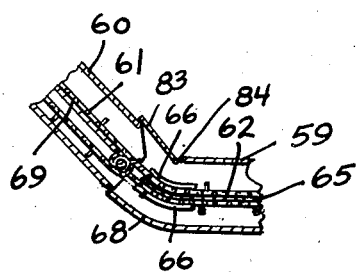
Figure 4 is a sectional detail of the junction of the unloading chutes.

The chute 60 includes the opening at 76 for allowing discharge of the elevated material, and it will be noted through the construction in Figure 4 that the material conveyed by the chain structure in the chute 59 will pass to the elevator construction of the chute 60, so that the material will thereby be elevated.

When the device is being used as a feed mixer, the rotation of the shafts 33 and 34, which rotation is caused by the engagement of the chain 44 with the various sprockets 47, 48, etc., will cause the various paddles 35 to thoroughly break up the lumps of silage or similar feed and thoroughly mix the same, as the feed is carried toward the front end of the box by means of the flaps 18, so that this feed will be thoroughly broken up when it enters the chute 59 and will thence be transported laterally and thence upwardly through the chute 60 and discharged through the opening 76 into a trough 77, so that in this way by driving the tractor along the side of the trough, it can be filled with the feed in a uniform manner along the entire length thereof.

Figure 3:
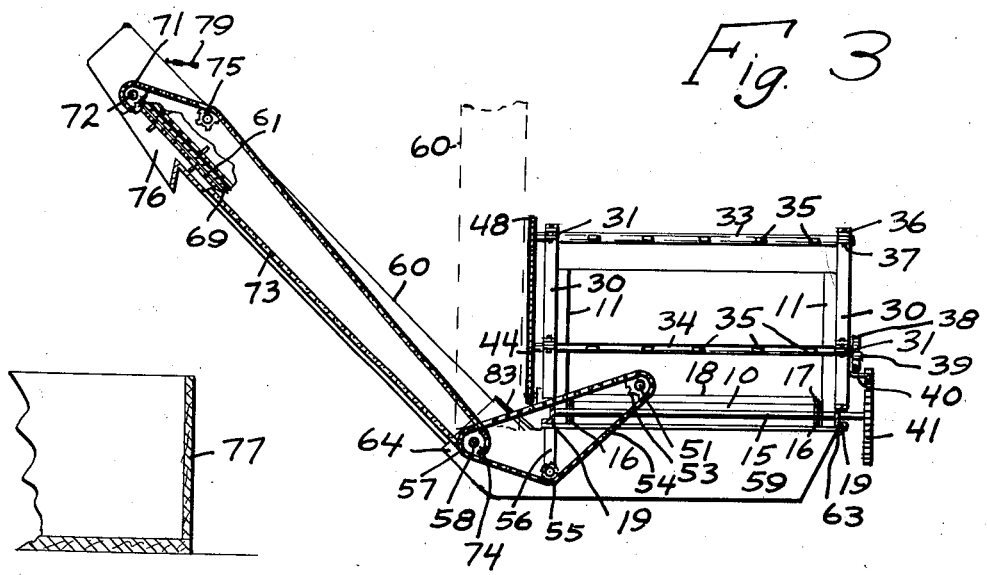
Figure 3 is a sectional view of Figure 2 taken generally along the lines 2—2 thereof.

The method of driving the various conveyors is apparent from the figures, especially Figure 3, wherein the sprocket chain 54 provides this result.

Attached to the chute 59 at 78 is a chain 79 which is attached at 80 to the top of the enclosure 81 which is normally used, this enclosure being in the form of a hood to enclose most of the mechanism. When it is desired to transport the unit through a gate or any other restricted area, the chute 60 can be swung upwardly to the position shown by the dotted lines in Figure 3, since the chute will pivot on the shaft 58, and any one of the links of the chain 79 can be hooked at the point 80, thereby securing the chute 60 in vertical position.

When it is desired to use the unit as a manure spreader, the entire chute structures comprising the members 59 and 60 are unbolted from the framework, and the shafts 33 and 34 are removed from the cavities 31, and the shafts of the usual type of manure spreading cylindrical cage structures as indicated by the dotted lines character 82 are placed in these cavities, with the sprocket structure 48, 47, etc. being attached to the shafts of these structures, and the unit can then be used as a manure spreader, the rotation of these members causing the manure, which has passed forwardly, to be discharged directly downwardly onto the ground through the opening formerly occupied by the chute 59.

A flap 83 is pivoted at 84 to cover the space between the chutes 59 and 60 when the chutes are used in the angular position, the pivotal flap 83 allowing the chute member 60 to be placed in the vertical position.

It will be obvious that since the tractor operator will be directly ahead of the functioning parts of the arrangement, he will be able to see the operation of the device at all times and thus be able to control the machine in a much more satisfactory manner.

It should be specifically understood that other types of drives, conveyor constructions, etc. could be used as well without departing from the essential spirit of my invention.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A device of the character described comprising a box, a conveyor at the bottom of said box to convey material forwardly, an elevator unit comprising a horizontally positioned elevator portion communicating with the forward end of said box, a further elevator portion communicating with said elevator portion, said further elevator portion being normally inclined angularly upwardly and having an upper opening for discharging material therethrough, said further elevator portion being pivotally secured to said horizontal elevator portion, a forward open framework attached to said box, means for attaching a drawing tractor to said framework, said horizontal elevator portion being secured to said framework, a further vertical framework, transverse shafts in said vertical framework including paddles attached thereto for mixing material, means for driving said shafts, said shafts being detachably secured to said vertical frameworks whereby manure spreading attachments can be supported thereby and operated, said elevator portions having conveyor members, said conveyor members communicating with each other to transfer material, said open framework member providing means for discharging manure downwardly therethrough when said horizontal elevator portion has been removed, means for securing said further elevator portion in vertical position when pivoted upwardly.

References Cited in the file of this patent

UNITED STATES PATENTS

| | | |
|---|---|---|
| 1,515,327 | Barkmann et al. | Nov. 11, 1924 |
| 2,431,000 | Step | Nov. 18, 1947 |
| 2,676,002 | Wolfe | Apr. 20, 1954 |
| 2,743,832 | Kappelmann | May 1, 1956 |
| 2,750,059 | Hintz et al. | June 12, 1956 |